US005845751A

United States Patent [19]

Chant

[11] Patent Number: 5,845,751

[45] Date of Patent: Dec. 8, 1998

[54] SAFETY LOCKING DEVICE

[76] Inventor: William Chant, 18021 S. Valley View Ave., Cerritos, Calif. 90703

[21] Appl. No.: 677,323

[22] Filed: Jul. 1, 1996

[51] Int. Cl.[6] .......................... B30B 15/14; B60K 41/26

[52] U.S. Cl. .......................... 192/4 R; 100/53; 188/69; 192/129 B

[58] Field of Search .......................... 192/129 B, 116.5, 192/4 R; 188/69; 100/53

[56] References Cited

U.S. PATENT DOCUMENTS

| | | | |
|---|---|---|---|
| 3,577,834 | 5/1971 | Bobst | 93/58.3 |
| 3,704,757 | 12/1972 | Buress | 188/69 X |
| 4,527,680 | 7/1985 | Sato | 188/69 X |
| 5,513,561 | 5/1996 | Biliskov et al. | 100/53 |

FOREIGN PATENT DOCUMENTS

| | | | |
|---|---|---|---|
| 781957 | 5/1935 | France | 188/69 |

OTHER PUBLICATIONS

Description and copies of photocopies of Bobst S.A. SPO 1575 EEG Val. 017/Gripper Bar Chain Safety Device.

*Primary Examiner*—Rodney H. Bonck
*Attorney, Agent, or Firm*—James E. Brunton

[57] ABSTRACT

A safety lock for use in connection with large chain-driven machines, such as die cutting and platen press machines, which positively prevents movement of the various cooperating moving parts of the machine when the machine is in a stopped, set-up position. The safety lock, when in the locking position, securely engages one or more of the sprocket wheels of the machine in a manner to positively prevent accidental rotation thereof.

9 Claims, 5 Drawing Sheets

SAFETY LOCKING DEVICE

BACKGROUND OF THE INVENTION

1. Field of the Invention

The present invention relates generally to safety devices for locking moving parts of heavy machinery against accidental movement. More particularly, the invention concerns a safety locking device for positively preventing rotation of a chain-carrying sprocket wheel of the character typically found in large presses and die cutting machines.

2. Discussion of the Invention

Die cutting and creasing presses are widely used in the paper, cardboard, corrugated and chipboard product industries. Generally such presses include relatively movable upper and lower platens at least one of which carries tools on its working face such as cutting blades and creasing rulers. To enable speedy passage of sheets of cardboard between the platens a pair of endless, gripper-bar-carrying chains trained over large rotatably mounted sprocket wheels are provided. A press of this general character is described in U.S. Pat. No. 3,577,834 issued to Lang and assigned to J. Bobst & Son S.A.

The Bobst company of Lausanne, Switzerland manufactures and sells a number of different types of machines that are widely used in the paper and cardboard industry, including an embodiment of U.S. Pat. No. 3,577,834, which comprises a large, flat bed die cutting machine designated by the manufacturer as SPO 1575-EEG. The safety lock of the present invention is specially designed for use with this particular machine, but is also suitable for use with many other types of chain-driven machines.

During set up, operation and repair of large presses and die cutting machines, it is imperative that the various moving parts of the machine be locked against accidental movement. Due to the very large size of many of the machines used in the cardboard and corrugated products industry, workman can actually enter the interior of the machine during set-up and repair and are, therefore, placed in great jeopardy unless the parts of the machine are positively locked against accidental movement. For this reason, it has been suggested in the past that safely locking mechanisms be provided for gripping the large endless chains of the machines in a manner to prevent accidental movement of the chains and concomitant movement of other associated moving parts of the machine, such as large gripper bars, which are driven by or operably coupled with the chains. While these types of safety devices have value, they are not without drawbacks. For example, although the devices may adequately prevent movement of the chains relative to the sprocket wheels of the machine so long as the chains are in tact, should the chain itself break, movement of large elevated cams and other mechanisms associated with the drive chain can move by force of gravity and, thereby, possibly cause serious injury to workmen in the area.

The safety locking device of the present invention elegantly solves the drawbacks of prior art chain locking safety devices by providing a safety lock that is automatically movable into secure locking engagement with one of the sprocket wheels about which the endless chain is trained so as to positively prevent rotation of the sprocket wheel even if the endless chain should fail.

This feature as well as various other novel aspects of the present invention will be better understood from the description which follows.

SUMMARY OF THE INVENTION

It is an object of the present invention to provide a safety lock for use in connection with large chain-driven machines, such as die cutting and platen press machines, which positively prevents movement of the various cooperating moving parts of the machine when the machine is in a stopped, set-up position.

More particularly, it is an object of the invention to provide a safety lock of the aforementioned character which, when in the locking position, securely engages one or more of the sprocket wheels of the machine in a manner to positively prevent accidental rotation.

Another object of the invention is to provide a safety lock of the character described which is compact, lightweight, and of a simple design that can easily be interconnected with the frame of the machine at a location proximate a rotating sprocket wheel.

Another object of the invention is to provide a safety lock which can be easily interconnected with the controls of the machine so that it operates automatically to lockably engage a sprocket wheel of the machine when the machine is stopped in its normal set-up position and can then be automatically moved into an unlocked position when machine operation is resumed.

Another object of the invention is to provide a safety lock as described in the preceding paragraphs, that can be operated by a pneumatic cylinder which is coupled with conventional, electrically operated pneumatic valves and related controls that can be readily interconnected with the operating controls provided by the manufacturer of the machine.

Another object of the invention is to provide a safety lock which is highly reliable in operation, can be easily installed without the necessity for major modifications to the die cutting machine or press and one which in no way interferes with the normal operation of the machine.

These and other objectives of the invention are realized by the novel safety lock described in greater detail in the paragraphs which follow.

DISCUSSION OF THE INVENTION

Figure 1:
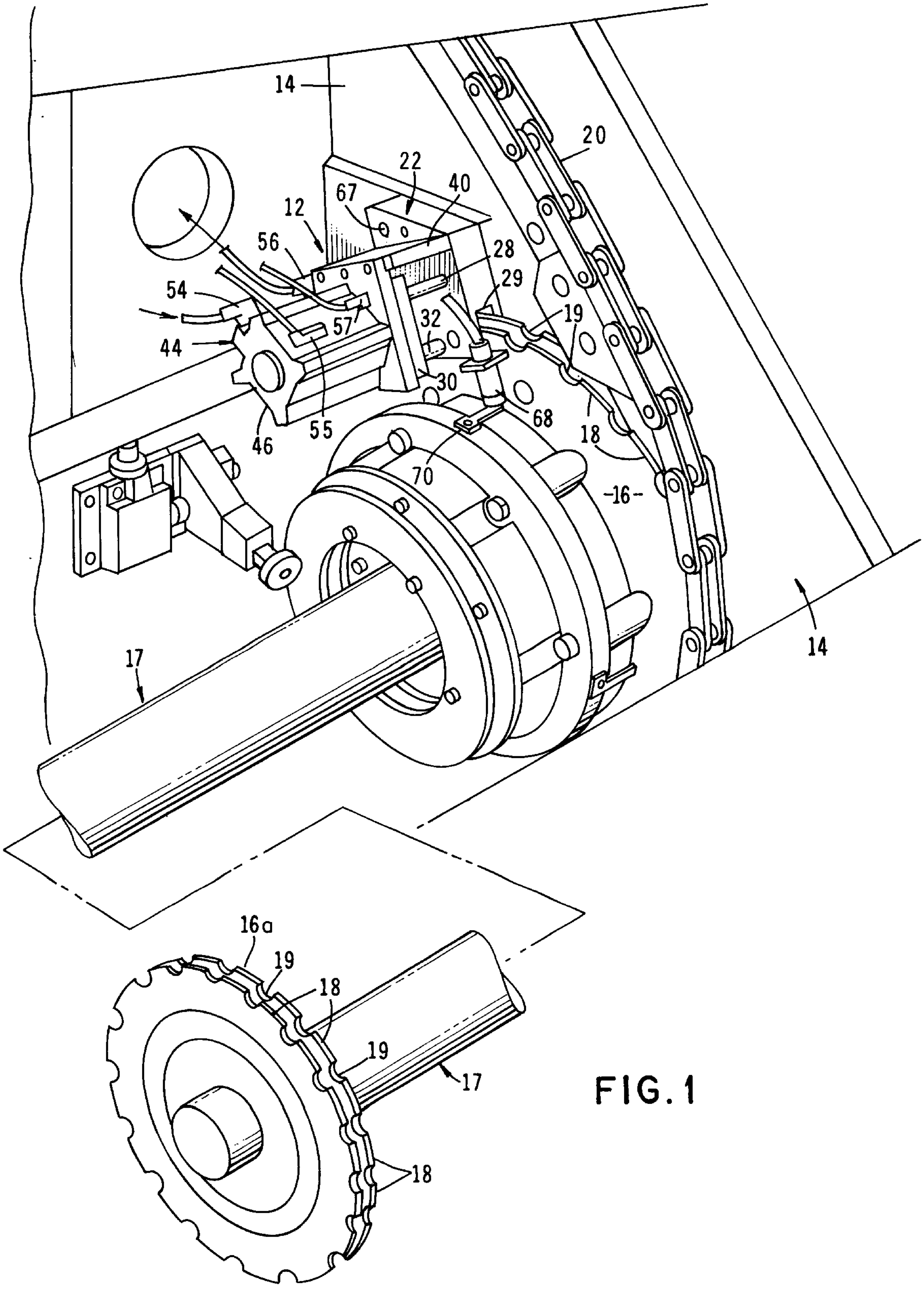
FIG. 1 is a fragmentary, generally perspective view of the safety locking device of the present invention mounted proximate a sprocket wheel of a large die cutting and creasing press of the character used in the cardboard and corrugated and chipboard product industries.
Figure 2:
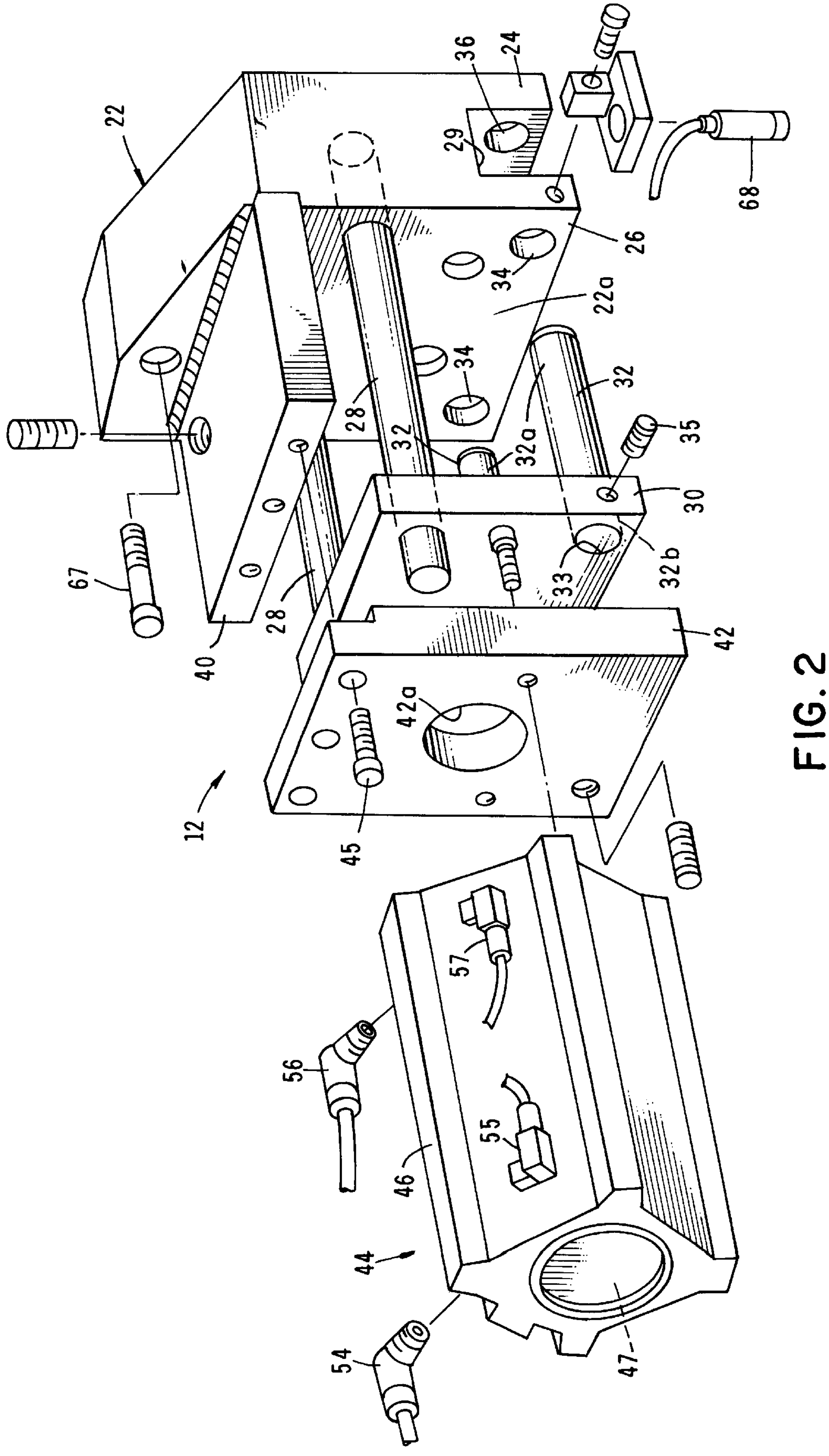
FIG. 2 is a generally perspective, exploded view of the safety locking device of the invention.

Referring to the drawings and particularly to FIGS. 1 and 2, one form of the platen press safety lock device of the present invention is there illustrated and generally designated by the numeral 12. The safety lock, the operating components of which are best seen in FIG. 2, is specially designed for use with large die cutting machines and platen presses of the character widely used in the cardboard and corrugated and chipboard product industries. Typically, these large machines, a portion of one of which is illustrated in FIG. 1, comprise a basic frame 14 to which sprocket wheels 16 and 16*a* are rotatably connected by means of a transversely extending axle assembly 17. Each of the sprocket wheels 16 and 16*a* include a plurality of circumferentially spaced teeth 18 which are engagable by the links of endless chains. One of these chains, designated in FIG. 1 by the numeral 20 is trained about sprocket wheel 16 in the manner illustrated in FIG. 1 and is also typically entrained about a plurality of driving and idler sprocket wheels of the character illustrated and described in U. S. Pat. No. 3,577,834 issued to Lang. This latter patent describes in greater detail a platen press of the type with which the safety lock of the present invention can be used. Because of the importance of U.S. Pat. No. 3,577,834 to a complete understanding of the present invention, U.S. Pat. No. 3,577,834 is hereby incorporated by reference as though fully set forth herein.

Figure 3:
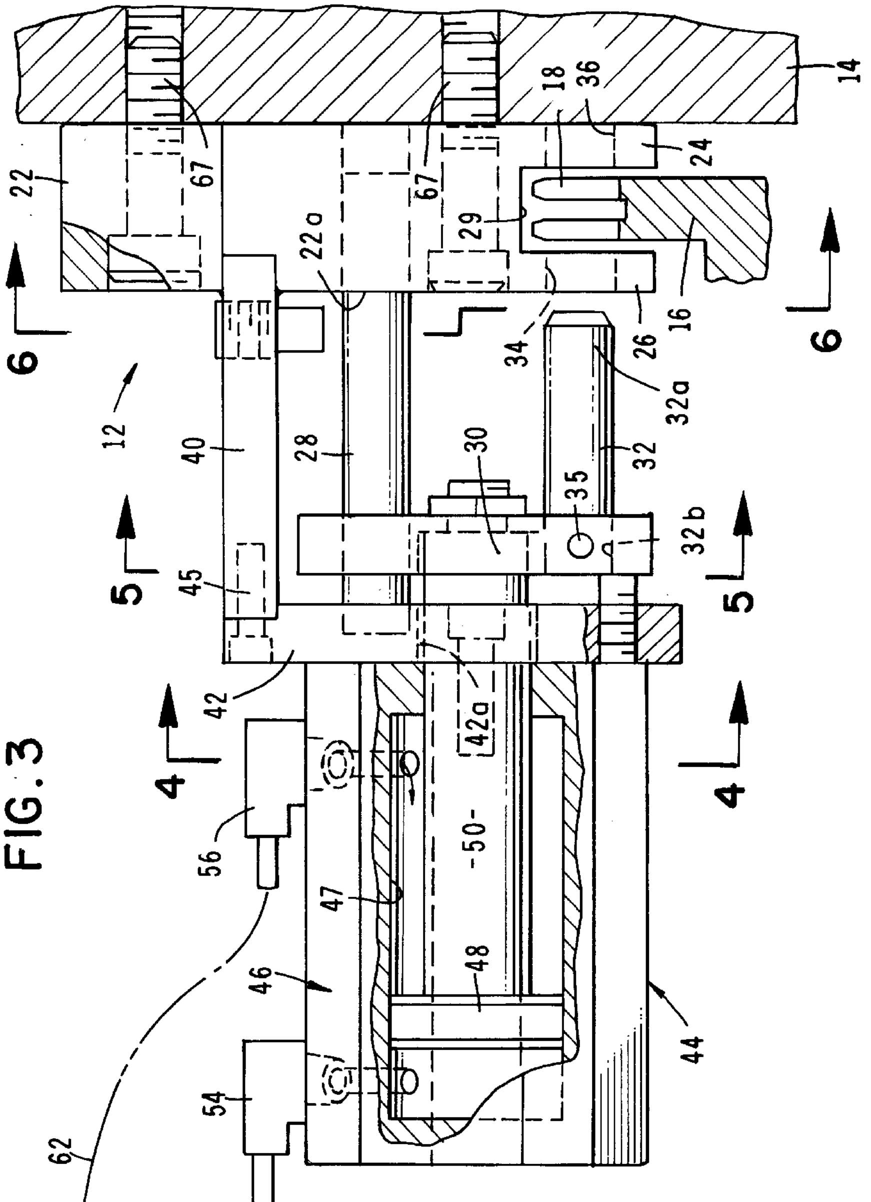
FIG. 3 is a side-elevational, partially schematic view of the safety locking device depicted as being interconnected with appropriate solenoid control valves and an electrical control panel for operation of the pneumatic cylinder assembly unit of the device.
Figure 4:
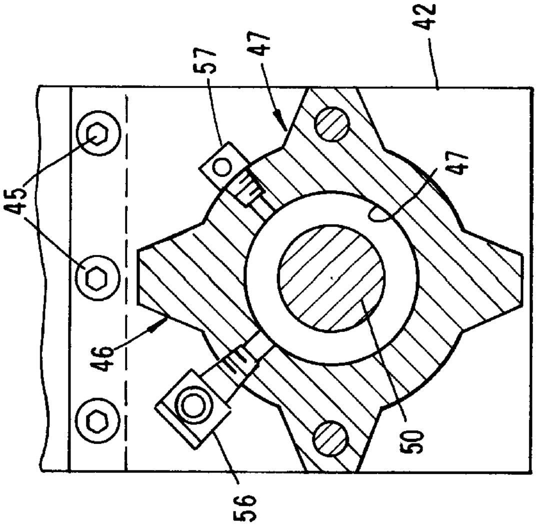
FIG. 4 is a cross-sectional view taken along lines 4—4 of FIG. 3.
Figure 6:
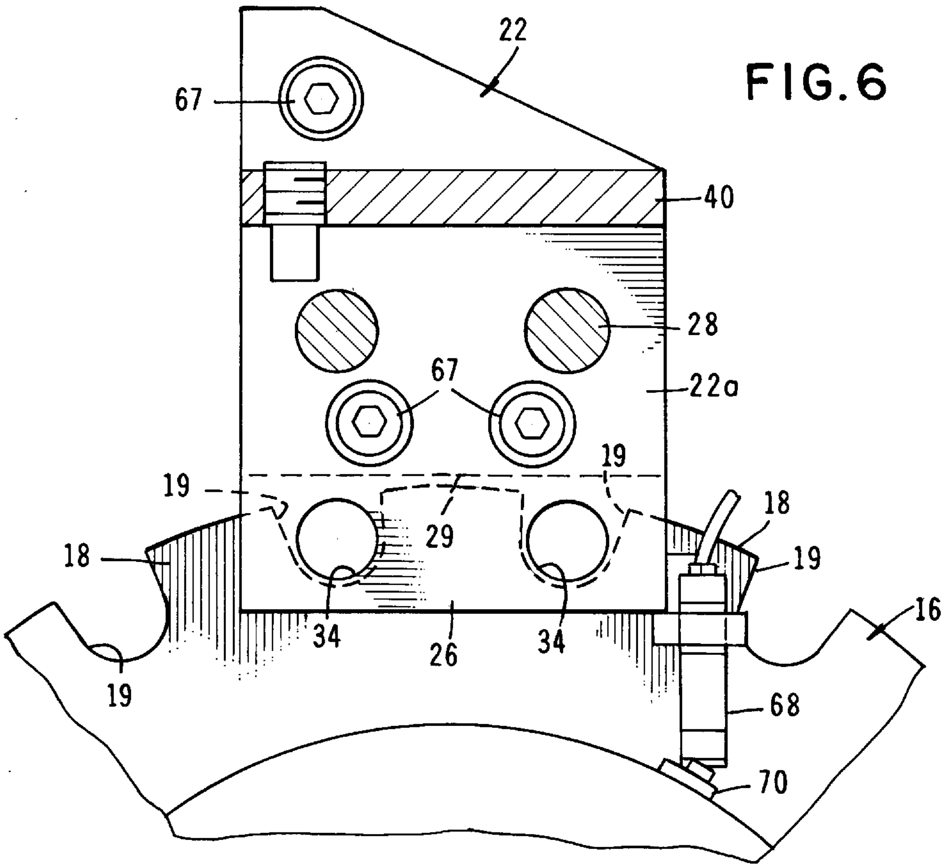
FIG. 6 is a cross-sectional view taken along lines 6—6 of FIG. 3.
Figure 7:
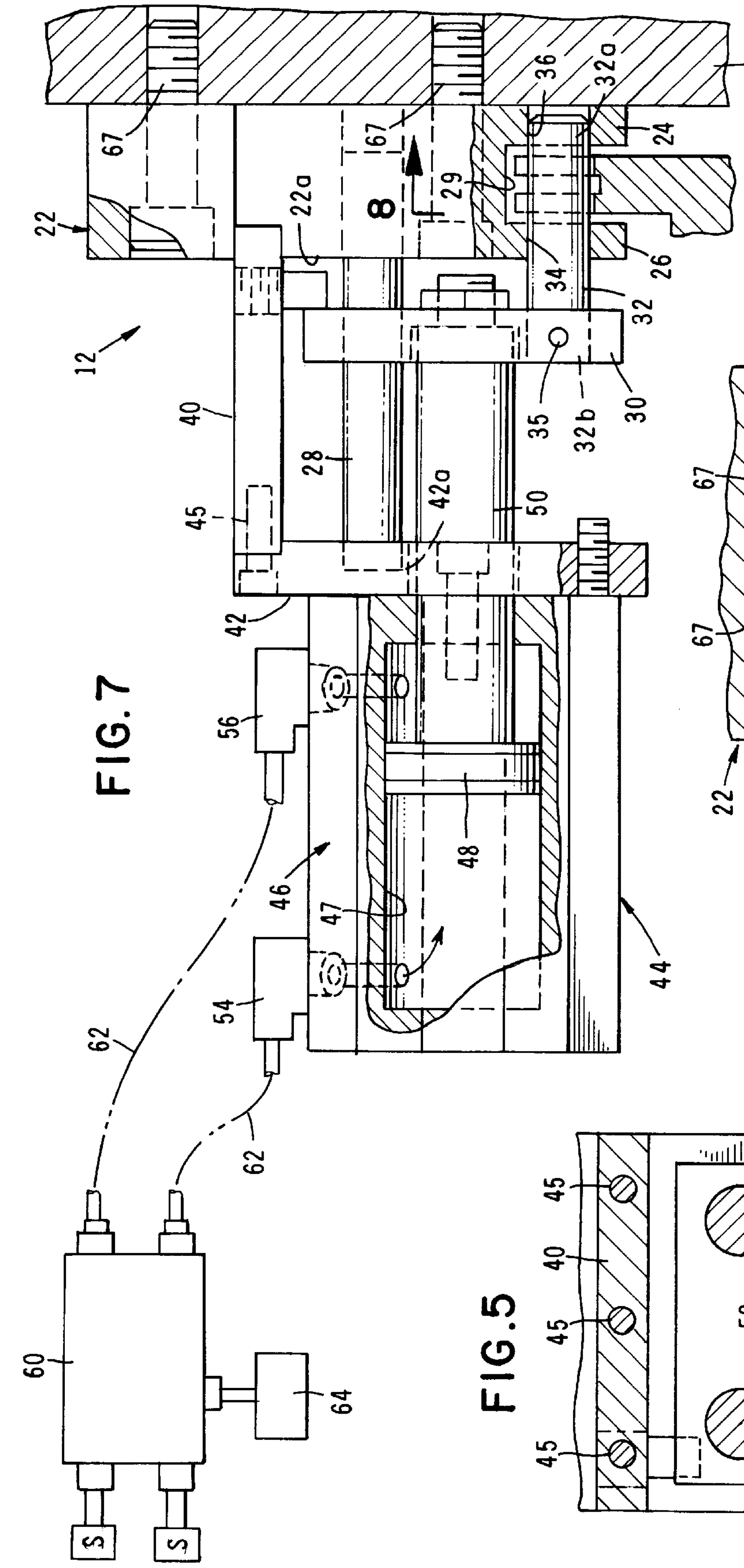
FIG. 7 is a side-elevational, partially schematic view similar to FIG. 3, but showing the locking device in a locking configuration relative to the sprocket wheel of the machine.
Figure 8:
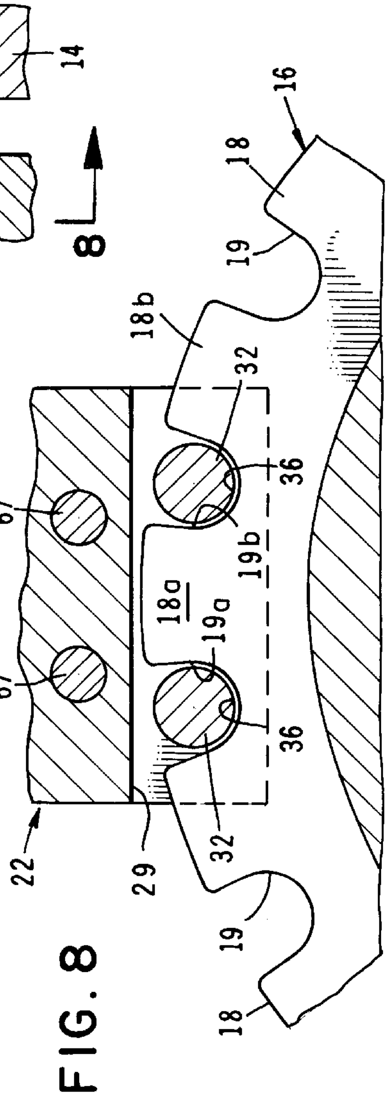
FIG. 8 is an enlarged, cross-sectional view taken along lines 8—8 of FIG. 7.
Figure 5:
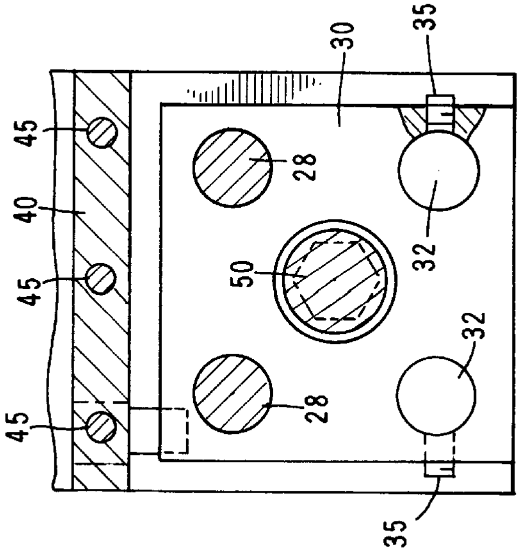
FIG. 5 is a cross-sectional view taken along lines 5—5 of FIG. 3.

As illustrated in the drawings and particularly in FIGS. 1, 7 and 8, the safety lock of the present invention functions to prevent rotation of the sprocket wheel 16 when the safety lock is moved into the sprocket wheel locking position illustrated in FIG. 7. Referring particularly to FIGS. 2, 3, and 7, the safety lock device of the form of the invention there illustrated comprises means defining a sprocket wheel receiving opening or channel, which is here provided in the form of a locking block 22 that is constructed from steel or other suitable metal (FIGS. 2 and 3). As best seen in FIG. 2, locking block 22 includes first and second integrally formed, downwardly depending, spaced-apart wall portions 24 and 26 which cooperate to define therebetween a sprocket-wheel receiving channel 29.

Connected to locking block 22 and extending inward there-from, that is away from sprocket wheel 16, is a pair of spaced-apart guide shafts 28 which guide movement of a connector means, which, in a manner presently to be described, connects the actuating means of the invention with the sprocket-locking members. The connector means here comprises a connector or shuttle, plate 30 which is controllably movable toward and away from the rear face 22*a* of the locking block 22 by the actuating means of the invention. Affixed to plate 30 and extending outwardly therefrom in a direction toward sprocket wheel 16, is a pair of spaced-apart, rod-like locking members 32. The outboard end portions 32*a* of locking members 32 are closely receivable within aligned bores 34 and 36 provided in walls 24 and 26 of locking block 22. As indicated in FIGS. 7 and 8, when members 32 are in a locking position, they extend through bores 34, through sprocket-receiving opening, or channel 29, and into bores 36 which are precisely aligned with bores 34. The inboard end portions 32*b* of members 32 are receivable in bores 33 provided in shuttle plate 30 and are secured therewithin by set screws 35 (FIG. 1). When locking pins 32 are in the sprocket wheel locking position shown in FIG. 7 and 8, they extend into channel 29 and into the openings 19*a* and 19*b* which are located between a pair of adjacent sprocket-wheel teeth 18*a* and 18*b* (FIG. 8) of sprocket wheel 16.

Extending inwardly of the machine from locking block 22 is a plate-like connector bracket 40 which is rigidly connected to locking block 22 by any suitable means such as welding. Bracket 42, which is also preferably constructed of a metal such as steel, is superimposed over guide rods 28 and functions to support an apertured pneumatic cylinder support plate 42 which is securely connected to bracket 40 by suitable threaded connectors such as connectors 44 (FIG. 2). Plate 42 functions to support a pneumatic cylinder assembly which is generally designated in FIG. 2 by the numeral 44 and which comprises a part of the actuating means of the invention for moving locking members 32 into locking engagement with sprocket wheel 16. Pneumatic cylinder assembly 44, which is connected to plate 42 in any suitable manner, is of a conventional construction well known to those skilled in the art and is readily available from a number of commercial sources such as MAC Valve Industries of Wixom, Mich.

As best seen in FIGS. 3 and 7, pneumatic cylinder assembly 44 includes a pneumatic cylinder 46 having an internal chamber 47 within which a piston 48 is reciprocally movable. A connecting rod 50, which comprises a part of the connector means of the invention, extends through a central aperture 42*a* of plate 42 and functions to interconnect piston 48 with shuttle plate 30 so that as piston 48 reciprocates within chamber 47, shuttle plate 30 will be controllably moved along guide shafts 28 from the retracted position shown in FIG. 3 to the extended locking position shown in FIG. 7. As shuttle plate 30 is moved between the extended position in the locking position, locking pins 32 will move from their retracted position shown in FIG. 3 into their extended locking position shown in FIG. 7, in which position the locking pins 32 extend through sprocket-wheel receiving channel 28 and into the spaces 19 located between adjacent teeth provided on sprocket wheel 16.

Also comprising a part of the actuating means of the invention are means for introducing and exhausting air under pressure into and out of chamber 47. These means are here provided in the form of a pair of pneumatic inlet connectors 54 and 56, and a pair of pneumatic outlet connectors 55 and 57. These connectors, which are connected to pneumatic cylinder 46 in the manner best seen in FIG. 2, are of a character well known to those skilled in the art and function to alternately permit introduction and exhaust of air under pressure on opposite sides of piston 48 so as to alternately drive piston 48 forwardly and rearwardly of chamber 46. Each of the pneumatic connectors is interconnected with valve means shown here as a conventional type of valving unit 60 by means of suitable pneumatic conduits such as conduits 62 (FIGS. 3 and 7). Valving unit 60 is, in turn, suitably interconnected with a pair of sources of operating fluid such as air under pressure which are designated in FIGS. 3 and 7 by the letters "S". Pneumatic valve unit 60 is also interconnected with an electrical control means shown here as a control unit 64, which is also of a character well known to those skilled in the art. Control unit 64 functions to selectively operate solenoid valves (not shown) which form a part of the valve means, or valving unit 60, of the invention so as to control the flow of air under pressure in to conduits 62 and toward pneumatic units 54 and 56 respectively and out of chamber 47 via exhaust units 55 and 57. Valving unit 60 as well as electrical control unit 64 are of a character well known to those skilled in the art and their manner of interconnection to operate the pneumatic cylinder assembly in the manner described is well known and reed not be described in detail herein.

In operating the apparatus of the present invention, with the safety lock device assembled in the manner shown in FIG. 3, locking block 22 is interconnected with frame 14 by a plurality of connectors such as threaded connectors 67. Locking block 22 is positioned relative to frame 14 so that, when the sprocket wheel 16 is in the position shown in FIG. 1, locking pins 32 will precisely align with the spaces 19 located between sprocket teeth 18 so that the locking members can extend between the locking teeth in the manner shown in FIG. 8. When the safety lock is used in connection with the Bobst Machine SPO 1575-EEG, locking block 22 is connected to the machine frame using threaded bores provided to interconnect a chain displacement device that is provided by the manufacturer. When this device is removed, locking block 22 can be easily connected to the machine frame in place of the chain tensioning device.

Typically forming a part of the electrical control of the die cutting or platen press of the machine with which the safety lock of the invention is used, is a sensor 68 which functions to sense the location of a locator tab 70 which is provided on the sprocket wheel shaft assembly 17. Sensor 68, in conjunction with the control system of the machine, functions to stop rotation of the sprocket wheel 16 at the precise position at which the sensor 68 senses sensing tab 70. With the various component parts of the platen press including sprocket wheel 16 stopped in this strategic, predetermined position, workmen can accomplish all the necessary set-up steps required for the correct operation of the machine. Accordingly, when the machine is stopped in this strategic set-up position, it is vital that the moving parts of the machine be securely locked in position so that no movement thereof will occur during the various set-up operations performed by technicians working within and without the confines of the machine.

As previously mentioned, various prior art safety locking means have been suggested to lock the component parts of the platen press in the set-up position. Among the approaches that have been suggested is the provision of locking means for grasping the endless chain 20 to prevent accidental movement from the set-up position shown in FIG. 1. The drawback of this particular approach, however, is that, if the chain 20 were, for some reason, to break, the sprocket wheel as well as various other moving parts of the machine could move due to the weight of heavy cams and other component parts of the platen press which may be disposed in an elevated position when the device is stopped in the set-up position shown in FIG. 1. As previously discussed, the safety lock of the present invention, overcomes this drawback of the prior art and functions to positively locks the sprocket wheels 16 in the set-up position shown in FIG. 1 and positively prevents rotation of the sprocket wheel as well as the moving components of the machine which are associated therewith. In this way, once the sprocket wheel is securely locked against movement by the safety lock of the present invention, workmen can safely enter the confines of the platen press to do all necessary set-up work.

With the safety lock of the invention properly connected to the frame of the machine, when the machine is stopped through operation of the machine control unit 64, sensor 68 will cause the sprocket wheel 16 to stop at the precise set-up position shown in FIGS. 1, 7, and 8. After a short delay of a few seconds, the valve means, or valve assembly 60 will be operated to cause air under pressure to enter chamber 47 via pneumatic inlet unit 54. This will cause piston 48, along with pusher or control member 50, to move to the right as seen in FIG. 7. Pusher 50, which is connected to shuttle plate 30 will cause the shuttle plate, along with locking members 32, to also move to the right and into sprocket wheel channel 29. Because sprocket wheel 16 has been stopped in the correct set-up position, the locking members can freely pass into spaces 19*a* and 19*b* (FIG. 8), thereby positively preventing any rotation of the sprocket wheel.

Figure 9:
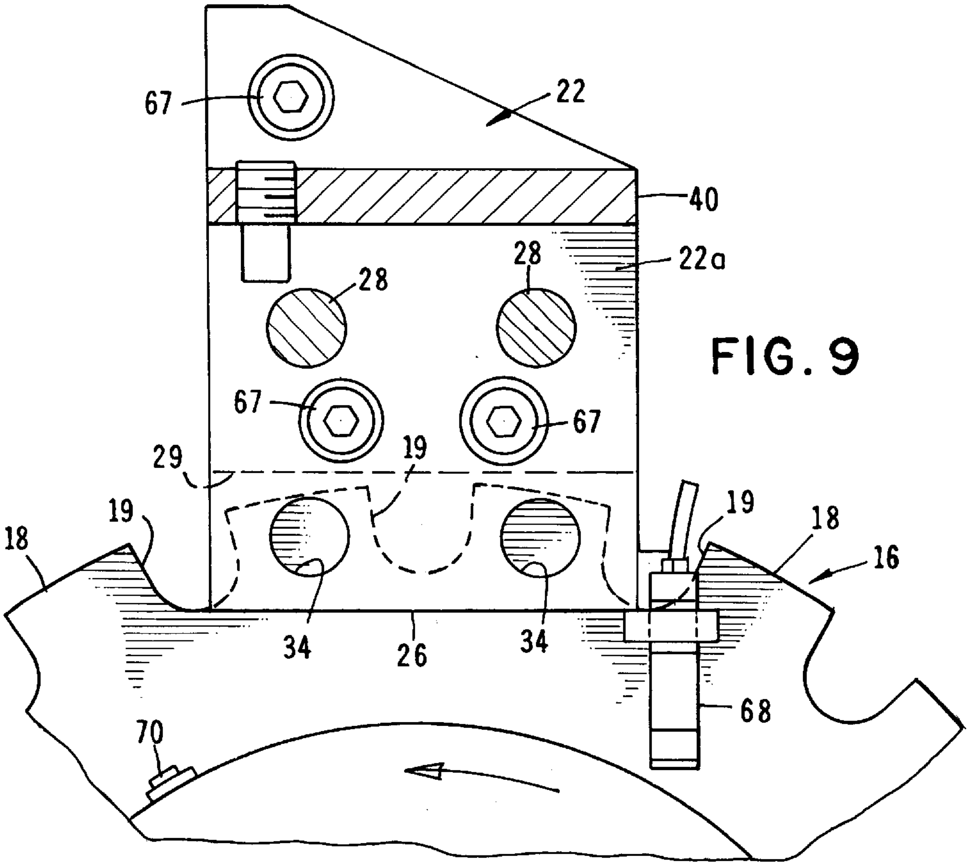
FIG. 9 is a view similar to FIG. 8, but showing the locking members of the safety lock retracted from the rotating sprocket wheel of the die cutting machine.

When the set-up work is completed and operation of the platen press is to resume, manipulation of the electrical control means, or control unit 64 will cause the automatic operation of pneumatic valve means 60 in a manner to cause air under pressure to enter cylinder 46 via pneumatic unit 56 thereby forcing piston 48 rearwardly of chamber 46 into the position shown in FIG. 3. As the piston moves rearwardly, air behind of the piston will be exhausted via outlet 55. In the retracted position, locking pins 32 have moved out of the sprocket wheel channel 29 so that the sprocket wheel is once again free to rotate (see FIG. 9).

When the machine is once again stopped by operation of the electrical control unit 64, the pneumatic valve mean or valve unit 60 will once again be actuated so that air under pressure will enter chamber 47 of the pneumatic cylinder via pneumatic unit 54 at a location rearwardly of piston 48 so that the air under pressure will urge piston 48 along with connector 50 and shuttle plate 30, forwardly from the position shown in FIG. 3 into the locking position shown in FIG. 7. As the piston moves forwardly, air will be exhausted via outlet unit 57. As the shuttle plate 30 moves forwardly or to the right, locking pins 32 will be urged into sprocket wheel channel 29 and will extend between adjacent sprocket wheel teeth 18*a* and 18*b* in the manner shown in FIG. 8 so as to once again positively prevent rotation of the sprocket wheel in either direction.

As previously mentioned, the safety device of the present invention can comprise an integral part of a platen press or die cutting machine as originally manufactured, or it can be added to various types of prior art machines such as the Bobst Machines previously identified herein and described in U.S. Pat. No. 3,577,834.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A safety lock for preventing rotation of a sprocket wheel having a plurality of circumferentially spaced teeth, comprising locking means disposed proximate the sprocket wheel for lockably engaging a tooth thereof, said locking means comprising:

(a) a locking member movable toward and away from the sprocket wheel; and (b) actuating means for controllably moving said locking member toward and away from the sprocket wheel, said actuating means comprising:

(i) a pneumatic cylinder connected to said locking block;

(ii) a piston reciprocally movable within said pneumatic cylinder; and (iii) connector means for interconnecting said piston with said locking member;

(c) means defining a sprocket wheel receiving opening for receiving the sprocket wheel, said locking member being reciprocally movable within said opening by said actuating means, said means defining a sprocket wheel receiving opening comprising:

(i) a locking block including first and second spaced-apart side plates, at least one of said side plates having a locking member receiving opening for closely receiving said locking member;

(ii) a guide shaft connected to said locking block and extending therefrom; and (iii) a shuttle plate slidably movable relative to said guide shaft, said locking member being connected to said shuttle plate and extending therefrom.

2. A safety lock as defined in claim 1 in which said means defining a sprocket wheel receiving opening further comprises:

(a) a bracket connected to said locking block and extending outwardly therefrom; and (b) a cylinder support connected to said bracket, said pneumatic cylinder being connected to said cylinder support.

3. A safety lock as defined in claim 2 in which said cylinder support includes an aperture and in which said connector means of said actuating means comprises a pusher member receivable within said aperture of said cylinder support for interconnection with said shuttle plate.

4. A safety lock for preventing rotation of a sprocket wheel having a plurality of circumferentially spaced teeth comprising:

(a) means defining a sprocket wheel receiving channel comprising:

(i) a locking block having first and second, spaced-apart, downwardly extending side plates, at least one of said side plates having a pair of locking-member receiving bores;

(ii) a pair of guide shafts connected to said locking block and extending therefrom; and (iii) a shuttle plate slidably movable relative to said pair of guide shafts; and (b) locking means disposed proximate said sprocket wheel receiving channel for locking engagement with said sprocket wheel comprising:

(i) a pair of spaced-apart locking members connected to said shuttle plate and extending therefrom, said locking members being receivable within said locking member receiving bores; and (ii) actuating means for moving said pair of spaced apart locking members toward and away from said sprocket wheel.

5. A safety lock as defined in claim 4 in which said actuating means comprises:

(a) a pneumatic cylinder connected to said locking block;

(b) a piston reciprocally movable within said pneumatic cylinder; and (c) connector means for interconnecting said piston with said pair of locking members for moving said locking members relative to said sprocket-wheel receiving channel.

6. A safety lock as defined in claim 5 in which said means defining a sprocket wheel receiving channel further comprises:

(a) a bracket connected to said locking block and extending outwardly therefrom; and (b) a cylinder support connected to said bracket, said pneumatic cylinder being connected to said cylinder support.

7. A platen press comprising:

(a) a frame;

(b) a sprocket wheel rotatably connected to said frame, said sprocket wheel having a plurality of circumferentially spaced teeth;

(c) a chain trained about said sprocket wheel; and (d) a safety lock for preventing rotation of said sprocket wheel comprising:

(i) a locking block connected to said frame proximate said sprocket wheel, said locking block having a sprocket receiving channel formed therein for receiving a portion of said sprocket wheel, said locking block including first and second spaced-apart side plates defining said sprocket receiving channel, at least one of said side plates having a locking member receiving opening;

(ii) a locking member disposed within said locking member receiving opening and connected to said locking block for movement toward and away from said sprocket wheel;

(iii) a guide shaft connected to said locking block and extending outwardly therefrom;

(iv) a shuttle plate slidably movable relative to said guide shaft, said locking member being connected to said shuttle plate and extending therefrom; and (v) actuating means for controllably moving said locking member toward and away from said sprocket wheel, said actuating means comprising:

a. a pneumatic cylinder connected to said locking block;

b. a piston reciprocally movable within said pneumatic cylinder; and c. connector means for interconnecting said piston with said locking member for moving said locking member relative to said sprocket-wheel receiving channel.

8. A platen press as defined in claim 7 further comprising:

(a) a bracket connected to said locking block and extending outwardly therefrom; and (b) a cylinder support having an aperture therein connected to said bracket, said pneumatic cylinder being connected to said cylinder support.

9. A platen press as defined in claim 8 in which said connector means comprises a connector member receivable within said aperture of said cylinder support.

* * * * *